United States Patent [19]

Stoltman et al.

[11] 4,445,369

[45] May 1, 1984

[54] HOT FILM SENSOR FOR AIR FLOW METER

[75] Inventors: Donald D. Stoltman, Henrietta; Daniel F. Kabasin, Rochester; Martin J. Field, Churchville, all of N.Y.

[73] Assignee: General Motors Corporation, Detroit, Mich.

[21] Appl. No.: 437,038

[22] Filed: Oct. 27, 1982

[51] Int. Cl.$^3$ ................................................ G01F 1/68
[52] U.S. Cl. ...................................... 73/204; 73/118.2
[58] Field of Search ............................. 73/118 A, 204

[56] References Cited

U.S. PATENT DOCUMENTS 3,709,035  1/1973  De Fries et al. ..................... 73/204
4,369,656  1/1943  Ueno et al. ...................... 73/118 A

FOREIGN PATENT DOCUMENTS 773497  10/1980  U.S.S.R. ............................... 73/204

Primary Examiner—Gerald Goldberg
Assistant Examiner—Brian Tumm
Attorney, Agent, or Firm—Warren D. Hill

[57] ABSTRACT

To measure the mass air flow in the induction passage of an engine, a small venturi located centrally in the passage serves as an air sampling tube. A slotted aperture in the wall of the tube at the venturi throat allows a hot film sensor to extend into the venturi throat from a support such as a printed circuit board mounted outside the venturi. The film sensor is in the form of a loop supported only at its ends on the support. The loop comprises a substrate of flexible insulating film material coated with an electrical resistance layer forming the active element of the sensor. The loop has a major dimension extending arcuately and transversely of the air flow through the venturi and a minor dimension extending parallel to the air flow.

6 Claims, 7 Drawing Figures

HOT FILM SENSOR FOR AIR FLOW METER

This invention relates to a sensor for a mass air flow meter and more particularly to a hot film sensor formed in a loop.

The technique of making mass air flow using a hot wire sensor or a hot film sensor is well known. The wire or film is an electrical resistor which is heated by a current to a temperature higher than the air temperature and the rate of cooling of the heated resistance is dependent upon the mass air flow through the passage containing the sensor. The heating current required to maintain the resistance at a constant temperature is a measure of the mass air flow as is well known. While wire sensors usually have the advantage of being smaller than film sensors the latter are much less effected by buildup of surface contaminants and also by virtue of their size can sample a greater amount of the air flowing through a passage. To place such a hot film sensor having a large area in a passage or a sampling tube having a small diameter presents challenging design considerations particularly where the linear extent of the sensor film is larger than the passage diameter. It has been proposed to secure a heated film sensor to the walls of a passage or sampling tube. That design has the inherent drawbacks that the sensor is exposed on only one side to the air flow and it is thermally coupled to the walls of the passage which slows the response to the sensor to changes of mass air flow and detracts from its sensitivity.

It is therefore an object of this invention to provide a hot film mass air flow sensor in an air passage in a manner to maximize the convective thermal loss from the sensor to the air and minimize the conductive film loss to the walls of the passage or other structure.

It is a further object of the invention to provide a hot film air sensor configuration which allows the placement of a sensor in a passage having a smaller diameter than the dimension of the sensor transverse to the air flow direction.

The invention is carried out by providing in a sampling tube or air flow passage a flexible thin hot film sensor formed in a loop traversing an arcuate path through the passage and supported only at the ends of the loop. The invention further comprehends such a sensor wherein the linear dimension of the sensor in a direction transverse to the airflow through the passage is greater than the diameter of the passage; while the other major dimension of the sensor lies in a direction parallel to the air flow direction.

These and other objects and advantages of the invention will be made more apparent from the following description and from the accompanying drawings in which like reference numerals refer to like parts and in which FIG. 1 is a cross-sectional elevation and FIG. 2 is a plan view of a hot film air sensor incorporated in an induction passage of an internal combustion engine according to the invention;

Figure 1:
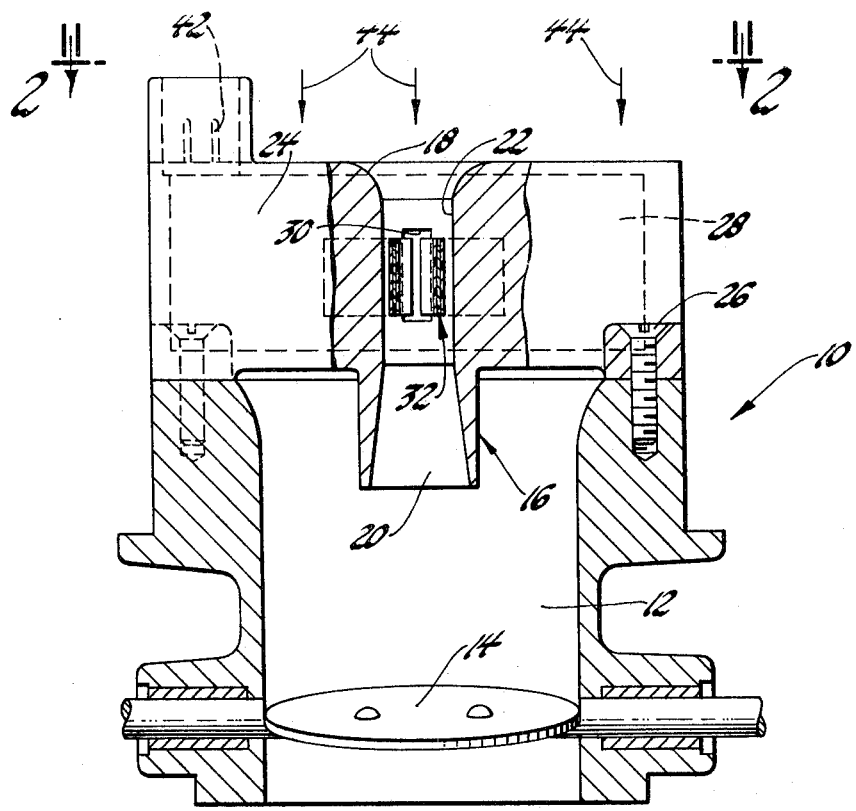
Figure 2:
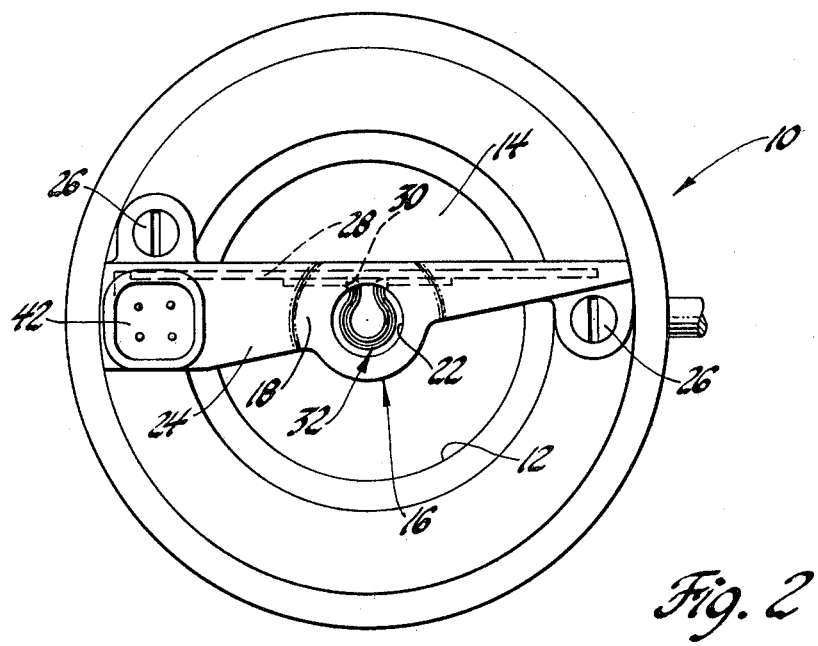

Referring to FIGS. 1 and 2, a throttle body 10 for an internal combustion engine comprises an induction passage having a bore 12 containing a throttle valve 14 and flaring out toward an intake passage not shown. A venturi tube 16 coaxial with the bore 12 has its inlet disposed upstream of the flared opening of the bore and its outlet disposed in the bore 12. The venturi includes a throat 22 between a flared inlet 18 and an outlet or diffuser 20. The venturi is supported by a web 24 which spans the opening of the bore 12 and is secured to the throttle body by screws 26 on opposite sides of the bore 12. A printed circuit board 28 carried by the web 24 extends across the passage and tangentially engages one side of the venturi 16. An elongated aperture or slot 30 is formed in the axial direction in the wall of the throat 22 of the venturi at the point of contact with the circuit board 28. A film sensor 32 in the form of a loop is adhesively attached to the circuit board at each end of the loop at points adjacent the aperture 30 and extends through the aperture into the venturi throat 22 where it curves in an arcuate path transverse of axial air flow through the venturi.

Figure 3:
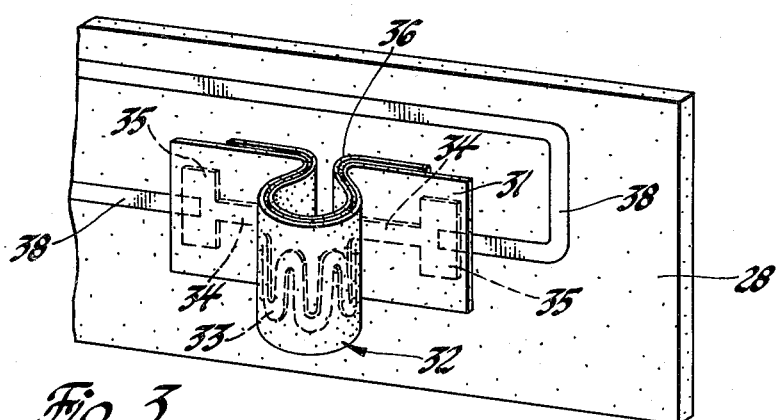
FIG. 3 is an isometric view of the hot film air sensor of FIGS. 1 and 2.
Figure 4:
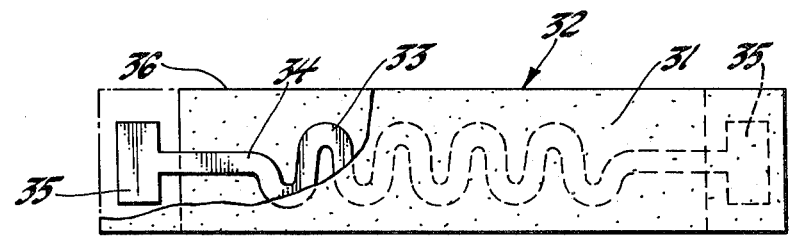
FIG. 4 is a partly broken away developed view of the hot film sensor of FIG. 3.

FIG. 3 depicts the looped film sensor 32 mounted on the circuit board 28, while FIG. 4 shows the same sensor stretched out in flat form. The sensor substrate 31 is a strip of insulating material which supports a resistance layer 33 forming the active sensor element. The resistance layer may be for example a thin continuous coating of platinum or on the other hand may be a copper coating formed in a sinuous pattern which has the required resistance. Each end of the resistance layer 33 is connected to a conductor 34 forming a lead terminating in a solder pad 35. A protective layer 36 of insulating film covers the resistance layer 33 and paths 34 but not the solder pads 35. Conductive pathways 38 on the circuit board 28 are soldered to the pads 35. The circuit board 28 incorporates other electrical components of the air meter as desired but which are not illustrated in the drawings. An electrical connector 42 (FIGS. 1 and 2) coupled to the circuit board 28 provides external coupling to a power supply and utilization circuitry, not shown, but which are well known in the art. Specific dimensions and materials for a preferred sensor film are as follows: the substrate is a 0.025 mm thick film of Kapton, which is a trademark of E. I. du Pont Nemours and Company, Inc. for a polyimide film. The substrate is 14 mm wide and sufficiently long to form a 10 mm diameter loop (for use in a 12 mm diameter venturi throat). The resistance layer 33 is a sinuous pattern of copper film about 0.01 mm thick having a resistance on the order of 5 ohms at 95° C. The sinuous pattern is 28 mm long and 12 mm wide. The protective layer 36 is a Kapton film 0.025 mm thick.

In operation air flows in the direction of the arrows 44 through the venturi 16 and around the venturi through the bore 12 to provide air for the engine. The venturi 16 serves as a sampling tube and thus a predetermined proportion of the total air flow passes through the venturi. That proportion remains constant over a wide range of air flow values. Due to the air velocity increase in the venturi throat 22 and the arrangement of the venturi at the opening of the bore 12 a velocity boost occurs at the sensor 32. That is, the air mass flow in the venturi while proportional to the total air mass flow is greater than would be sensed by a similar sensor in the bore 12 thereby providing an improved signal to noise ratio. The air flow through the venturi throat 22 is parallel to the venturi axis and is also parallel to the surface of the film sensor 32. The thin dimension of the film is presented frontally to the air flow so that the sensor has very little air resistance. The arcuate path of the film formed by the loop allows a much greater film length to be exposed to the air flow as compared to a sensor which is placed diametrically across the venturi. In addition the cylindrical curvature of the loop imparts an inherent rigidity to the film which serves to maintain its position in the air flow, that is, the film does not tend to flutter or twist in the venturi. Tests have indicated, however, that even when the foil is distorted by an external force or the pattern of air flow is distorted by a partial blockage, only minor variations occur in the sensor signal.

Because the film loop is supported only at the ends of the loop any thermal loss by conductivity must occur by heat flow along the length of the film to the ends of the loop. This very high thermal impedance path therefore results in a very low thermal loss to the support by conduction. On the other hand, the thermal loss by convection to the air flow is large because both sides of the film are exposed to the air flow resulting in an intimate thermal coupling with the air so that the sensitivity to air flow and response to changes in air flow are very high. Because the extent of the resistance layer transverse to the air flow is large compared to the width parallel to the air flow the sensor is primarily swept by fresh air not substantially heated by the resistance itself. In contrast, if a flat resistance film as shown in FIG. 4 were disposed in the venturi with its length along the direction of air flow, the air would become progressively hotter as it passed along the film so that the downstream end of the film would be exposed to warm air and have a slower response than the upstream end which is exposed to fresh air. Thus the loop configuration makes possible the optimum exposure of the film to unheated air.

Figure 5:
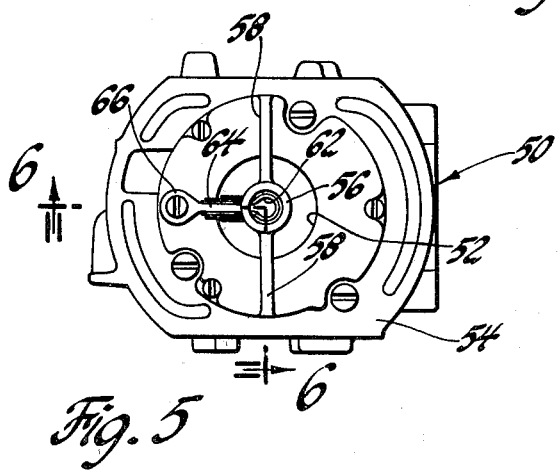
FIG. 5 is a plan view.
Figure 6:
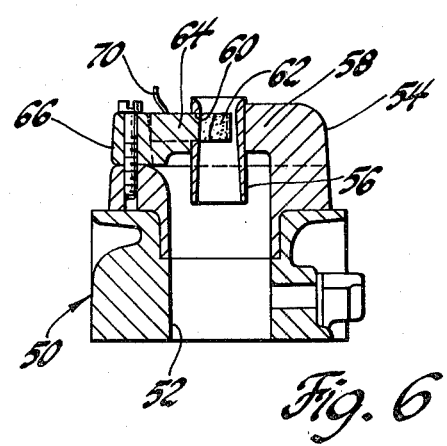
FIG. 6 is a cross-sectional elevation taken along line 6—6 of FIG. 5 of an induction passage for an engine incorporating another embodiment of a hot film air sensor.
Figure 7:
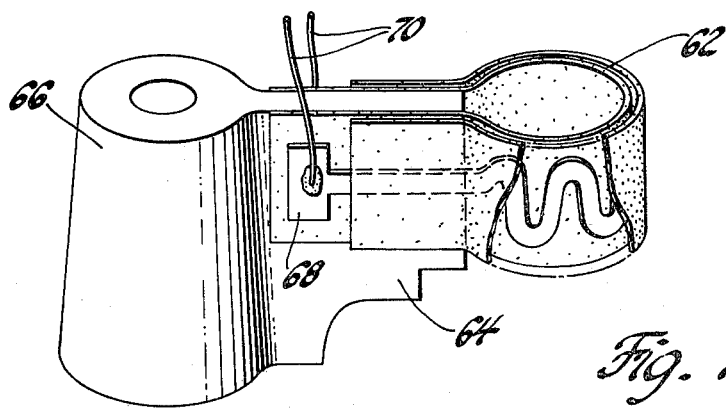
FIG. 7 is an isometric view of the air flow sensor of FIGS. 5 and 6.

Another embodiment of the invention is shown in FIGS. 5 and 6 which displays a throttle body 50 including an insert 54 which has a bore 52. A venturi 56 is supported by webs 58 coaxially with the bore 52. A slotted aperture 60 is placed at one side of the venturi throat similar to that aperture 30 shown in FIG. 1 and has the purpose of admitting a flexible hot film sensor 62. The film sensor 62 is mounted on a support plate 64 which has an inner end extending into the aperture 60 and an enlarged outer end 66 which is fastened by a screw running through the enlarged end and into the insert 54 such that the plate 64 extends radially across the opening of the bore 52 to the venturi 56. As shown in FIG. 7 the ends of the loop sensor 62 engage opposite sides of the plate 64 and extend along the sides of the plate toward the enlarged portion 66. Except for the extra length of the loop ends and the conductors 34 the loop sensor has the same structure as that of FIG. 4. Solder pads 68 on the sensor are soldered to wire leads 70 which connect to external circuitry, not shown. In operation the film sensor of FIGS. 5, 6 and 7 is like that of FIGS. 1 and 2.

It will thus be seen that the heated film sensor according to this invention has distinct advantages in many respects over other hot film or hot wire sensors known in the prior art and while it is particularly well suited for application to air measurement in engine induction passages such as in a throttle body having a boost venturi it is not limited to such an application. Indeed it may be used for the measurement of mass air flow in other environments having a tube or passage for carrying air.

The embodiments of the invention in which an exclusive property or privilege is claimed are defined as follows:

1. In an air mass flow meter for measuring air flow moving substantially axially through a passage, a hot film sensor in the passage comprising:
    a support, a flexible insulating film having one surface dimension extending in the direction of the air flow and another surface dimension extending in a loop transversely of the passage, the film being attached at the ends of the loop to two spaced regions on the support, and a flexible resistance film supported on the looped insulating film whereby the resistance film describes a curved path extending transversely of the passage for intimate thermal coupling to the air flow.

2. In an air mass flow meter for measuring air flow moving substantially axially through a passage, a hot film sensor in the passage comprising:
    a venturi tube supported in the passage for sampling the air flow and providing a velocity boost to air flow in the venturi throat, the tube having an aperture in the side thereof,
    a support outside the tube and adjacent thereto, a flexible insulating film having one surface dimension extending in the direction of the air flow and another surface dimension extending in a loop transversely of the venturi throat, the film being attached at the ends of the loop to two spaced regions on the support and extending through the aperture into the throat of the venturi tube, and a flexible resistance film supported on the looped insulating film, whereby the resistance film describes a curved path extending transversely of the venturi throat for intimate thermal coupling to the air flow.

3. In an air mass flow meter for measuring air flow through a passage, a hot film sensor comprising:
    a support, a flexible insulating film formed in a loop extending through the passage and attached at the ends of the loop to two spaced regions on the support, and a flexible resistance layer on the looped insulating film, the film and resistor layer lying in a curved cylindrical surface generated by a straight line element parallel to the direction of air flow moving along an arcuate path transverse to the direction of air flow, whereby the air passes in a laminar flow across the surface of the film in intimate thermal coupling with the resistance layer.

4. In an air mass flow meter for measuring air flow through a tube, a hot film sensor disposed in the tube comprising:
    an aperture in the side of the tube,
    a support outside the tube and adjacent thereto, a flexible insulating film including a resistance layer formed in a loop and attached at the ends of the loop to two spaced regions on the support and extending through the aperture into the tube, the film comprising the loop having a long dimension extending transverse to the air flow for a distance greater than the tube diameter and having a width extending parallel to the air flow for a distance smaller than the long dimension whereby the resistance layer describes a curve path through the tube for intimate thermal coupling to the air flow for optimal cooling of the resistance layer by the air flow.

5. In an air mass flow meter for measuring air flow moving substantially axially through a passage, a hot film sensor in the passage comprising:
- an air sampling tube supported in the passage for sampling the air flow, the tube having an elongated aperture in the side thereof,
- a support comprising a printed circuit board mounted in the passage tangential to the tube adjacent the aperture, and
- a flexible insulating film including a resistance layer having one surface dimension extending in the direction of the air flow and another surface dimension extending in a loop transversely of the tube, the film extending through the aperture and being attached at the ends of the loop to two spaced regions on one side of the circuit board and electrically connected thereto, whereby the resistance layer describes a curve path extending transversely of the tube for intimate thermal coupling to the air flow.

6. In an air mass flow meter for measuring air flow moving substantially axially through a passage, a hot film sensor in the passage comprising:
- an air sampling tube supported in the passage for sampling the air flow, the tube having an elongated aperture in the side thereof,
- a support mounted in the passage extending toward the tube radially of the passage with an edge of the support adjacent the aperture, and
- a flexible insulating film including a resistance layer having one surface dimension extending in the direction of the air flow and another surface dimension extending in a loop transversely of the tube, the film extending through the aperture and being attached at the ends of the loop to two spaced regions on opposite sides of the support, whereby the resistance layer describes a curved path extending transversely of the passage for intimate thermal coupling to the air flow.

* * * * *